United States Patent [19]

Kano et al.

[11] Patent Number: 5,071,509

[45] Date of Patent: Dec. 10, 1991

[54] CHIP COIL MANUFACTURING METHOD

[75] Inventors: Osamu Kano; Atsuo Senda, both of Nagaokakyo, Japan

[73] Assignee: Murata Mfg. Co., Ltd, Japan

[21] Appl. No.: 671,670

[22] Filed: Mar. 19, 1991

Related U.S. Application Data

[63] Continuation of Ser. No. 395,907, Aug. 18, 1989, abandoned.

[30] Foreign Application Priority Data

Aug. 19, 1988 [JP] Japan ................................ 63-206951

[51] Int. Cl.[5] ........................ B44C 1/22; B29C 37/00; C23F 1/02

[52] U.S. Cl. ...................................... 156/644; 29/846; 156/655; 156/656; 156/659.1; 156/668; 156/901

[58] Field of Search ............... 156/629, 633, 634, 655, 156/656, 659.1, 661.1, 901, 902, 668; 29/846, 848, 852, 856, 602.1; 336/200, 205, 206, 208; 174/250, 251, 267

[56] References Cited

U.S. PATENT DOCUMENTS

| | | | |
|---|---|---|---|
| 2,699,425 | 1/1955 | Nieter | 156/901 X |
| 3,413,716 | 12/1968 | Schwertz et al. | 336/200 X |
| 3,584,376 | 6/1971 | Howe et al. | 29/625 |
| 3,913,219 | 10/1975 | Lichtblau | 29/592 |
| 4,075,591 | 2/1978 | Haas | 336/200 X |
| 4,369,557 | 1/1983 | Vandebult | 336/200 X |
| 4,682,402 | 7/1987 | Yamaguchi | 357/59 X |
| 4,873,757 | 10/1989 | Williams | 29/602.1 |

FOREIGN PATENT DOCUMENTS

| | | |
|---|---|---|
| 0051902A1 | 5/1982 | European Pat. Off. . |
| 60-15905 | 1/1985 | Japan . |
| 60-246605 | 12/1985 | Japan . |
| 1394086A | 5/1975 | United Kingdom . |
| 1416246A | 12/1975 | United Kingdom . |

*Primary Examiner*—William A. Powell

*Attorney, Agent, or Firm*—Ostrolenk, Faber, Gerb & Soffen

[57] ABSTRACT

A chip coil includes an insulating substrate on which a spiral coil conductor and first and second terminal electrodes are formed. The coil conductor and the terminal electrodes are made by forming a conductive film on the whole of both main surfaces of the insulating substrate and then etching the same. A first insulation film made of polyimide or polyamide is formed on the insulating substrate so as to cover the coil conductor and the terminal electrodes. The first insulation film is etched such that portions corresponding to the terminal electrodes are removed and a throughhole is formed at a portion corresponding in position to the innermost end of the coil conductor. A further conductive film is formed on the first insulation film and etched so as to form a connecting conductor, the ends of which are respectively connected to the innermost end of the coil conductor and the second terminal electrode, through the throughhole. In addition, a second insulation film is formed on the insulating substrate and subsequently etched, whereby the first and second terminal electrodes are exposed.

10 Claims, 5 Drawing Sheets

CHIP COIL MANUFACTURING METHOD

This is a continuation of application Ser. No. 07/395,907 filed on Aug. 18, 1981, now abandoned.

BACKGROUND OF THE INVENTION

1. Field of the invention

The present invention relates to a chip coil and a manufacturing method thereof. More specifically, the present invention relates to a chip coil which includes a coil conductor formed on an insulating substrate and a pair of terminal electrodes formed on both ends of the insulating substrate and connected to both ends of the coil conductor, and a manufacturing method thereof.

2. Description of the prior art

In a conventional chip coil 1 shown in FIG. 5, by means of screen printing Ag paste, a spiral coil conductor 3 is formed on a surface of an alumina substrate 2 and terminal electrodes 4*a* and 4*b* are formed on both ends of the alumina substrate 2. The outermost end of the coil conductor 3 is connected to one terminal electrode 4*a* and the innermost end of the coil conductor 3 is connected to the terminal electrode 4*b* by a connecting electrode 6 which is formed on a rear surface of the alumina substrate 2 through a throughhole 5 formed in the alumina substrate 2.

In such a conventional chip coil 1, the coil conductor 3 and the terminal electrodes 4*a* and 4*b* are formed by means of a screen printing method. Therefore, it was impossible to make a line width of the coil conductor 3 less than 150 μm. In addition, it was impossible to make a diameter of the throughhole 5 formed in the alumina substrate 2 less than 200 μm since if and when the diameter of the throughhole 5 is less than 200 μm, it is difficult to form a metallized layer for the connecting electrode 6 in the throughhole 5. Therefore, in the conventional manufacturing method, it was impossible to obtain a chip coil which is miniaturized and has good reliability.

A method capable of solving such a problem is disclosed in the Japanese Patent Application Laid-open No. 110009/1980 laid-open on Aug. 25, 1980. In the prior art disclosed in the Japanese Patent Application Laid-Open No. 110009/1980, a conductive film is formed on the whole main surface of an insulating substrate by means of vacuum evaporation, and by etching the conductive film, a plurality of strip conductors are formed on the main surface at a predetermined interval. By painting or applying an insulation film made of polyimide on portions of the strip conductors except for respective both ends thereof and forming further strip conductors on the insulation film, a coil conductor in which the ends of the respective strip conductors are connected to each other can be formed.

By the method disclosed in the Japanese Patent Application Laid-open No. 110009/1980, since the plurality of strip conductors are formed by etching, it is possible to make a line width of the coil conductor smaller than that of the conventional method, and it is not necessary to form a throughhole for connecting the terminal electrodes to the coil conductor or to employ a wire-bonding technique. Therefore, there was an advantage that a chip coil which is miniaturized can be obtained.

However, in the method disclosed in the Japanese Patent Application Laid-open No. 110009/1980, it is necessary to paint or apply the insulation film on only middle portions of the respective strip conductors such that the both ends of the respective strip conductors can be exposed. However, a work for painting or applying the insulation film such that only the both ends of the fine strip conductors can be accurately exposed is very difficult, and therefore, dimensional precision becomes low due to such difficulty. Therefore, a problem occurs in reliability of the chip coil.

SUMMARY OF THE INVENTION

Therefore, a principal object of the present invention is to provide a chip coil capable of being miniaturized and having good reliability.

Another object of the present invention is to provide a manufacturing method wherein a chip coil capable of being miniaturized and having good reliability can be obtained.

A manufacturing method in accordance with the present invention comprises the following steps of (a) preparing a substrate having an insulating surface; (b) forming a conductive film on the whole insulating surface of the substrate by means of a thin-film technique; (c) forming a coil conductor and a pair of terminal electrodes on the insulating surface of the substrate by removing an unnecessary portion of the conductive film by means of etching; (d) forming an insulation film on the substrate so as to cover the coil conductor and the pair of terminal electrodes; and (e) exposing the pair of terminal electrodes by removing an unnecessary portion of the insulation film by means of etching.

In accordance with the present invention, since the coil conductor is formed by means of etching, it is possible to make a line spacing width and a line interval of a coil conductor very fine. Therefore, a chip coil which is miniaturized as a whole can be obtained. In addition, since the terminal electrodes are exposed by etching the insulation film which is formed on the whole surface, it is possible to expose the terminal electrodes with good dimensional precision, and therefore, it is possible to obtain a chip coil having good reliability.

A chip coil in accordance with the present invention comprises a substrate having an insulating surface; a coil conductor and a pair of terminal electrodes formed on the insulating surface of the substrate; and an insulation film formed by means of an etching technique such that the insulation film can cover the coil conductor but the pair of terminal electrodes can be exposed.

In one embodiment of the present invention, the coil conductor is formed in a spiral fashion. Since the coil conductor and the first and second terminal electrodes can be simultaneously formed in the same etching process, the outer most end of the spiral coil conductor is connected to the first terminal electrode on the insulating surface of the substrate. However, it is necessary to connect the innermost end of the spiral coil conductor to the second terminal electrode in a further step or process. Therefore, in this embodiment, after forming the coil conductor and the first and second terminal electrodes, a first insulation film is formed on the whole insulating surface so as to cover the coil conductor and the first and second terminal electrodes. Next, by etching the first insulation film, the first and second terminal electrodes are exposed and a throughhole is formed at a portion corresponding in position to the innermost end of the spiral coil conductor. Then, a connecting conductor which connects the innermost end of the spiral coil conductor to the second terminal electrode through the throughhole is formed on the first insulation film. A second insulation film is formed on the substrate so as to cover the first and second terminal electrodes, the first insulation film and the connecting conductor and, by removing an unnecessary portion of the second insulation film by means of etching, the first and second terminal electrodes can be exposed.

In accordance with this embodiment, in order to connect the innermost end of the spiral coil conductor and the second terminal electrode, it is not necessary to form a throughhole in the substrate or to employ a wire-bonding technique as done in the conventional method, and therefore, not only miniaturization of the chip coil but also an increase of its reliability can be expected. In addition, since it is not necessary to form a metalized layer on an inner wall of the throughhole, it is possible to make the diameter of the throughhole which is formed in the first insulation film very small.

A chip coil in accordance with this embodiment comprises a substrate having an insulating surface; a spiral coil conductor and first and second terminal electrodes formed on the insulating surface of the substrate by means of etching, the outermost end of said spiral coil conductor being connected to the first terminal electrode and the inner end of the spiral coil conductor being open; a first insulation film formed by means of etching so as to cover the spiral coil conductor but not to cover the first and second terminal electrodes; a throughhole formed by means of etching at a portion corresponding in position to the innermost end of the spiral coil conductor; a connecting conductor formed on the first insulation film by means of etching, the ends of which are connected to the innermost end of the spiral coil conductor and the second terminal electrode through the throughhole; and a second insulation film formed on the first insulation film by means of etching such that the first and second terminal electrodes can be exposed.

The objects and other foregoing, features, aspects and advantages of the present invention will become more apparent from the following detailed description of the preferred embodiments of the present invention when taken in conjunction with the accompanying drawings.

DETAIL DESCRIPTION OF THE PREFERRED EMBODIMENTS

Figure 1:
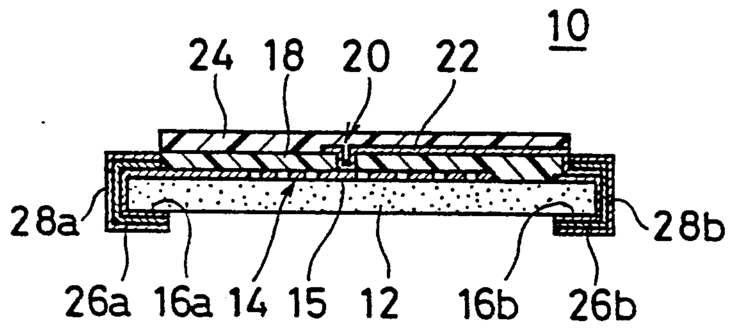
FIG. 1 is a cross-sectional view taken along line I—I in FIG. 2E showing one embodiment in accordance with the present invention.
Figure 2A:
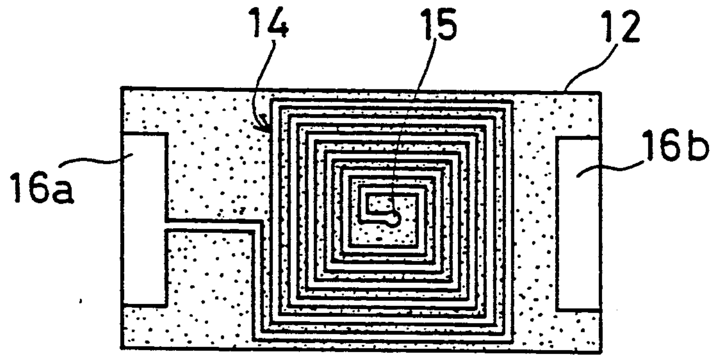
FIG. 2A–FIG. 2E are illustrative views showing a method for manufacturing the chip coil of the FIG. 1 embodiment.

With reference to FIG. 1, a chip coil 10 includes a substrate 12 which is made of an insulating glass and has an insulating surface. As shown in FIG. 2A, a spiral coil conductor 14 is formed on an upper surface of the substrate 12. The outermost end of the coil conductor 14 is extended to one end of the substrate 12 and connected to a first terminal electrode **16*a* which is formed at that portion. A second terminal electrode 16*b* is formed at the other end of the substrate 12. On the upper surface of the substrate 12, including the coil conductor 14, an insulation film 18 is formed except for portions of the first and second terminal electrodes 16*a* and 16*b*. A throughhole 20 is formed at a portion of the insulation film 18 corresponding in position to the innermost end 15 of the coil conductor 14. A connecting conductor 22 is formed on the insulation film 18 so as to connect the innermost end 15 of the coil conductor 14 and the second terminal electrode 16*b* to each other through the throughhole 20. On the insulation film 18 and the connecting conductor 22, a protective insulation film 24 is formed such that the first and second terminal electrodes 16*a* and 16*b*** can be exposed.

In addition, on the first and second terminal electrodes **16*a* and 16*b*, Ni films 26*a* and 26*b* are formed by means of electrolytic plating. Then, solder films 28*a* and 28*b* are formed on the Ni films 26*a* and 26*b*. Thus, the chip coil 10** is completed.

Next, with reference to FIG. 2A–FIG. 2E and FIG. 3A–FIG. 3J, a method for manufacturing the chip coil 10 of the FIG. 1 embodiment will be described.

First, a mother board **12*a* (FIG. 3A) which has not yet been cut to form the chip substrate 12 shown in FIG. 2A is prepared. Such a mother board 12*a*is made of an insulating material such as a glass, a crystalized glass, an alumina or the like, for example. Then, after mirror finishing both main surfaces of the mother board 12*a*, the mother board 12*a*** is washed.

Figure 3A:
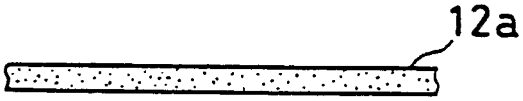
FIG. 3A–FIG. 3J are illustrative views showing a specific method for manufacturing the chip coil of the FIG. 1 embodiment.
Figure 3B:
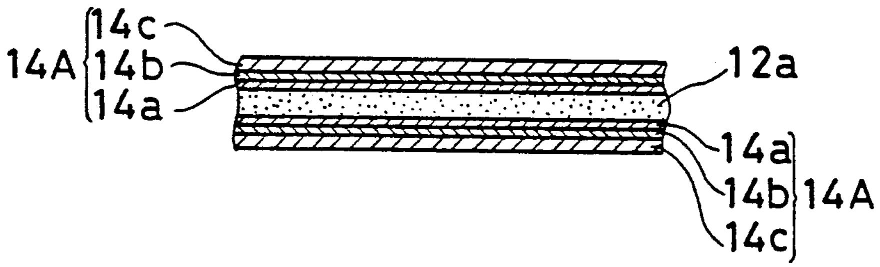

Next, a Ti film **14*a* is formed completely over both main surfaces of the mother board 12*a* by means of a sputtering method. Then, by means of a two-element sputtering of Ti and Ag, a Ti-Ag film 14*b* is formed on the surface of the Ti film 14*a*. Then, an Ag film 14*c* is formed on the surface of the Ti-Ag film 14*b* by means of sputtering. Thus, a conductive film 14A having a three-layered structure is formed on both main surfaces of the mother board 12*a*, as shown in FIG. 3B. The conductive film 14A becomes the spiral coil conductor and the terminal electrodes shown in FIG. 1 or FIG. 2A. In addition, the Ti film 14*a* and the Ti-Ag film 14*b* increase the adhesion between the mother board 12*a* and the Ag film 14*c***.

Next, a photo-resist film 30 is formed on the surface of the above described conductive film 14A. Then the photo-resist film 30 is exposed, after the photo-resist film 30 has been covered with a mask which has been designed in advance in accordance with the shapes and positions of the coil conductor 14 and the first and the second terminal electrodes **16*a* and 16*b*. More specifically, light is irradiated onto a portion of the photo-resist film 30 that is intended to remain, and by developing the photo-resist film 30, unnecessary photo-resist film is removed. Thus, as shown in FIG. 3C, the photo-resist film 30 is formed on the portions corresponding to the coil conductor 14 and the first and second electrodes 16*a* and 16*b* (FIG. 1 or FIG. 2). Then, in that state, the mother board 12*a* is subjected to an etching process. Therefore, as shown in FIG. 3D, the conductive film 14A is removed from the portion where the photo-resist film 30 has been removed. Then, the rest of the photo-resist film 30 is removed. Thus, as shown in FIG. 2A (FIG. 1) or FIG. 3D, the spiral coil conductor 14 and the first and second terminal electrodes 16*a* and 16*b*** are simultaneously formed.

Figure 2B:
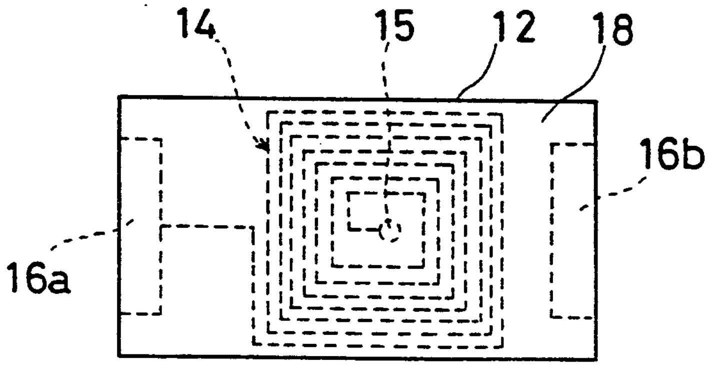
Figure 3C:
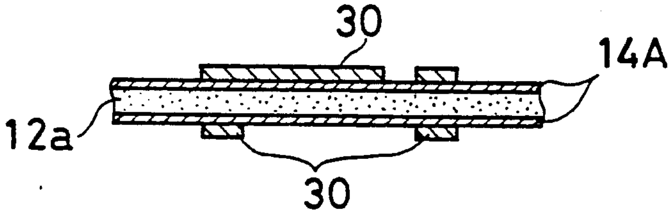
Figure 3D:
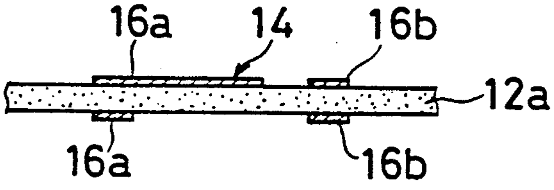
Figure 3E:
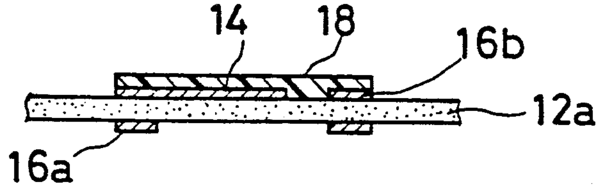

Then, as shown in FIG. 2B or FIG. 3E, an insulation film 18a made of a photosensitive polyimide resin is formed on the upper surface of the mother board 12a.

Figure 2C:
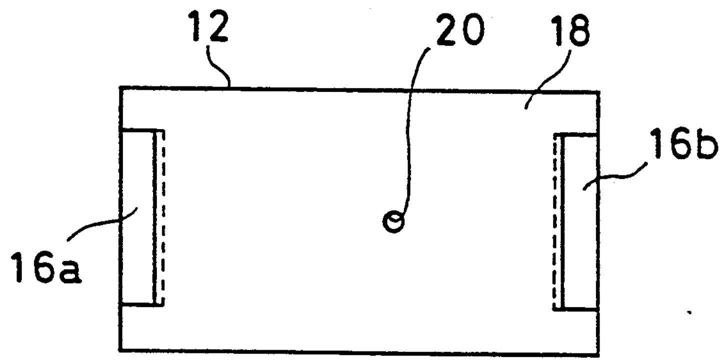
Figure 3F:
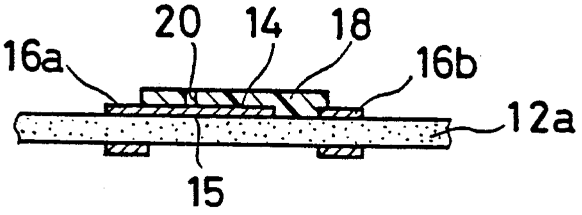

Then, portions of the insulation film 18a corresponding to the first and second terminal electrodes 16a and 16b and a portion corresponding to the innermost end 15 of the coil conductor 14 are covered by a mask and the insulation film 18a is exposed and succeedingly developed (etched). Therefore, as shown in FIG. 2C and FIG. 3F, the insulation film 18 is formed such that the first and second terminal electrodes 16a and 16b are exposed and the throughhole 20 is formed. At the throughhole 20, the innermost end 15 of the coil conductor 14 is exposed. Next, the mother board 12a is heated in an $N_2$ gas atmosphere at 400° C. to harden the insulation film 18.

In addition, in the case where the insulation film 18 is made of non-photosensitive polyimide, after the by forming a photo-resist film of a positive type, a portion of the insulation film intended to be removed may be exposed and developed.

Figure 2D:
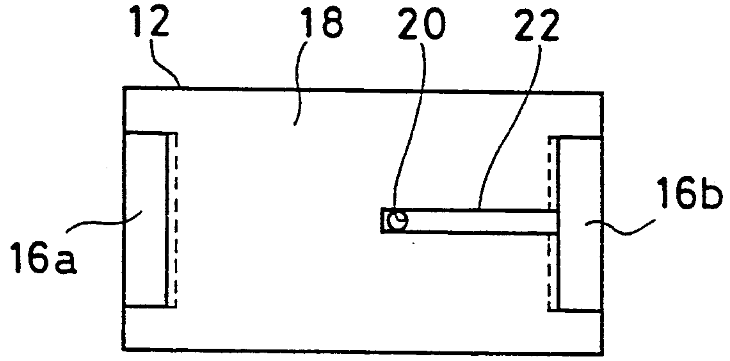
Figure 3G:
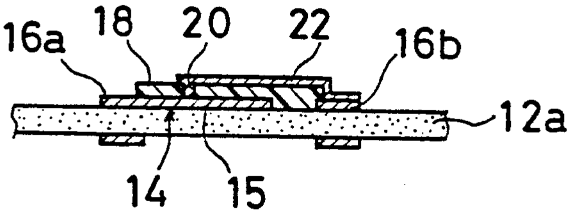

A conductive film is formed on the surface of the above described insulation film 18 by means of sputtering. Next, by means of etching, the connecting conductor 22 as shown in FIG. 1, FIG. 2D, or FIG. 3G is formed on the insulation film 18. One end of the connecting conductor 22 is connected to the innermost end 15 of the coil conductor 14 through the throughhole 20 and the other end of the connecting conductor 22 is connected to the second terminal electrode 16b.

Figure 2E:
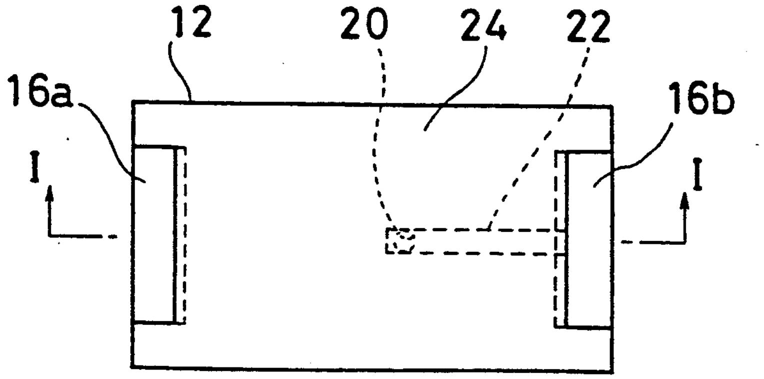
Figure 3H:
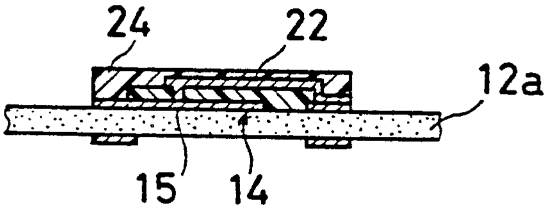

Next, as shown in FIG. 2E or FIG. 3H, a protective insulation film 24a made of a polyimide resin is formed on the upper surface of the mother board 12a. Then, portions of the protective insulation film 24a corresponding to the first and second terminal electrodes 16a and 16b are etched and removed. Therefore, the first and second terminal electrodes 16a and 16b can be exposed.

Figure 3I:
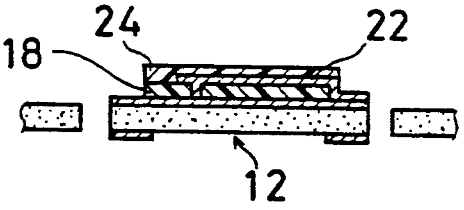

Thereafter, as shown in FIG. 3I, the mother board 12a is cut by means of a dicing saw such that the chip substrate 12 as shown in FIG. 2E can be obtained.

Figure 3J:
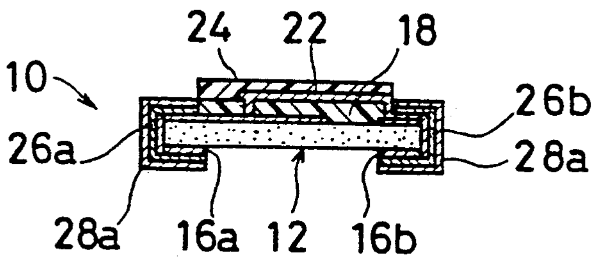

Thereafter, as shown in FIG. 3J, side electrodes are formed on both side surfaces of the respective chip substrate 12 from the same material as the coil conductor 14 and the first and second terminal electrodes 16a and 16b. Therefore, the first terminal electrodes 16a on both main surfaces of the substrate 12 are connected to each other and the second terminal electrodes 16b on the both main surfaces of the substrate 12 are connected to each other. Then, on the surfaces of the first and second terminal electrodes 16a and 16b which are thus formed continuously on the both ends of substrate 12 and the side surfaces thereof, Ni films 26a and 26b are formed, and thereafter, solder films or Sn films 28a and 28b are formed on the surfaces of the Ni films 26a and 26b. Thus, the chip coil 10 shown in FIG. 1 or FIG. 3J is obtained.

In a manufacturing method in accordance with this embodiment, since the coil conductor 14 is formed by means of sputtering and etching, it is possible to make the line width of the coil conductor 14 as fine to as 10 μm. In addition, since the throughhole 20 is formed by means of etching, the diameter thereof can be made as small as a few or several μm, and therefore, it is possible to make the substrate 12 small in view of these improvements in miniaturization. In addition, since it is possible to make the thickness of the coil conductor 14 as large to as 5 μm, an increase of Q can be expected.

In addition, the above described conductive film 14A may be formed by means of a thin-film technique such as vacuum deposition or ion plating rather than sputtering.

There are several reasons why polyimide or polyamide resin is used for the insulation film 18 and the protective insulation film 24. (1) The polyimide or polyamide resin has a dielectric constant smaller than that of an inorganic material such as $SiO_2$, $SiN_4$, PSG, SOG or the like and has good workability. In other words, by means of a photo-lithographic technique, it is possible to easily fine-work not only polyimide or polyamide resin having photosensitivity but also polyimide or polyamide resin having no photosensitivity. (2) In order to make the Q of the coil large, the thickness of the coil conductor also is to be made large such that the resistance of the conductor becomes small. On the other hand, when the thickness of the coil conductor is large, a step or unevenness is formed by the surface of the coil conductor and the surface of the substrate. However, by covering such a step or unevenness with the polyimide or polyamide resin, it is possible to even out the unevenness of the surface. Therefore, the thickness of the coil conductor can be made sufficiently large. In addition, since the surface is made smooth, the reliability of the connection between conductors on the substrate increases. (3) Since the polyimide or polyamide resin has heat resistance and chemical resistance, it is possible to easily form a conductive film thereon by means of a vacuum evaporation, sputtering or the like. In addition, such a resin is not seriously affected by a solution for electroless plating, electrolytic plating or etching, or an organic solvent. Therefore, the coil conductor is never attacked when etching the insulation film and the insulation film is never attacked when etching the conductive film for the connecting conductor.

Figure 4:
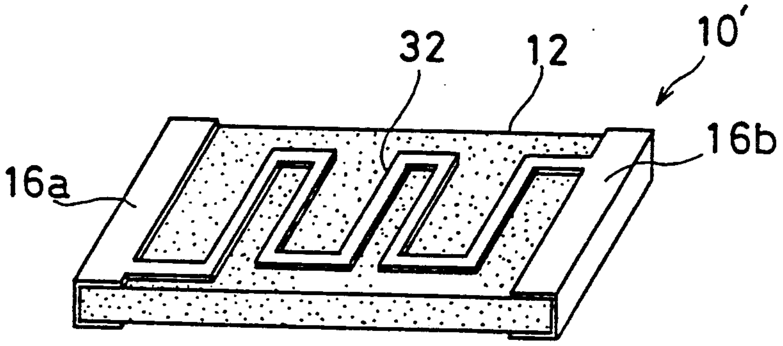
FIG. 4 is a perspective view showing a modified example of the FIG. 1 embodiment.
Figure 5:
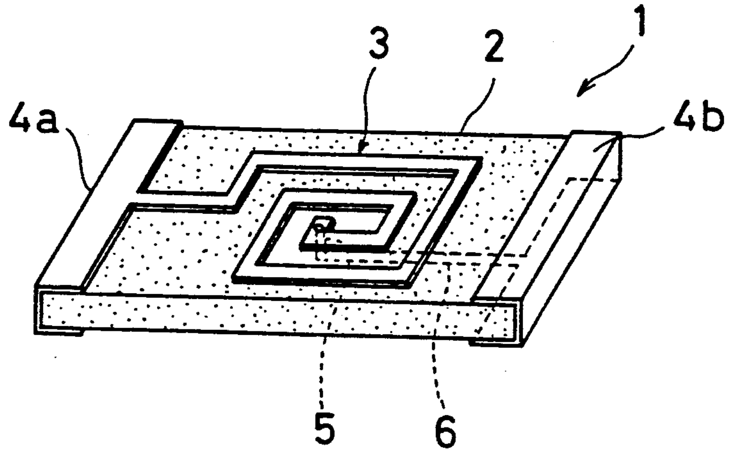
FIG. 5 PRIOR ART
FIG. 5 is a perspective view showing one example of a conventional chip coil.

In the above described embodiment, a spiral coil conductor is formed as the coil conductor 14. However, the specific form of the coil conductor to which the present invention is applicable is not so limited. For example, as shown in FIG. 4, a coil conductor 32 of a meander type may be formed. More specifically, on the insulating surface of the substrate 12, a meander type coil conductor 32 and the first and second terminal electrodes 16a and 16b are formed by means of the above described thin-film technique and etching. Then, a protective insulation film (not shown) is formed completely over the surfaces of the substrate 12 such that the protective insulation film can cover the coil conductor 32 and the first and second terminal electrodes 16a and 16b, and succeedingly etched. Therefore, it is possible to obtain a chip coil 10' in which the meander type coil conductor 32 is covered by the protective insulation film while the first and second terminal electrodes 16a and 16b are exposed.

In the FIG. 4 embodiment, since the coil conductor 32 and the first and second terminal electrodes 16a and 16b were already connected to each other at the time when the same were simultaneously formed, it will be easily understood that it is not necessary to form the insulation film 18, throughhole 20, and connecting conductor 22 of the previous embodiment.

As for the material for the conductor, it is not limited to Ti and Ag which are used in the above-disclosed embodiments. and Cu, Al, Ni, Cr, Pd or the like can be utilized as well.

Furthermore, the present invention can be applied to a so-called "multi-layered coil" in which a plurality of coil conductors and insulation films are alternately layered. In this case, respective coil conductors are connected to each other in a series fashion or a parallel fashion through a throughhole which is formed on each of the insulation films by means of etching.

EXPERIMENTAL EXAMPLE I

Surfaces of a crystalized glass board (thickness =0.6 mm) of the MgO: $Al_2O_3$: $SiO_2$ family is mirror finished, and a conductive film composed of a Ti film of 100 angstroms (Å), a Ti-Ag film of 1000 angstroms and an Ag film of 10000 angstroms (1 μm) is formed completely over both main surfaces of the board by means of sputtering. Next, by means of an etching method, a spiral coil conductor of 8 turns having a square form (1520×1520 μm), the line width and the line spacing interval of which are respectively 40 μm, and first and second terminal electrodes are formed. Next, a photosensitive polyimide is coated on an upper surface of the board to form an insulation film having a thickness of 2 μm, and thereafter, by etching the insulation film, the first and second terminal electrodes are exposed and a throughhole having a diameter of 140 μm is formed. Thereafter, the board is heated in an $N_2$ gas stream at 400° C. to harden the insulation film. Then, in the same way as the above described steps, a connecting conductor having a line width of 40 μm is formed on the insulation film to connect the coil conductor and the second terminal electrode. Then, a protective insulation film having a thickness of 2 μm is further formed, and thereafter, the board is cut by a dicing saw to obtain a chip of 1.6×3.2 mm. Thereafter, a process shown in FIG. 3J is performed, and a chip coil 10 (FIG. 1) is manufactured.

As a result of a measurement, a chip coil having characteristics of inductance: 60 nH, a resonant frequency: 2 GHz, and Q:89 (at 800 MHz) was obtained.

EXPERIMENTAL EXAMPLE II

A conductive film composed of a Ti film of 100 angstroms, a Ti-Ag film of 1000 angstroms and an Ag film of 3 μm is formed on both entire surfaces of the same mother board as the experimental example I by means of sputtering. Next, by means of an etching method, a spiral coil conductor of 4 turns having a square shape (1400×1400 μm), the line width and the line spacing interval of which are respectively 80 μm, and first and second terminal electrodes are formed. Succeedingly, an insulation film having a thickness of 5 μm is formed on an upper surface of the board, and thereafter, the insulation film is etched such that the first and second terminal electrodes are exposed and a throughhole having a diameter 140 μm is formed. Next, the board is heated in the $N_2$ gas stream at 400° C. to harden the insulation film. Then, by means of the same method as described above, a connecting conductor having a line width of 80 μm is formed on an upper surface of the insulation film to connect the coil conductor and the second terminal electrode to each other. Then, a protective insulation film having a thickness of 5 μm is formed, and thereafter, the board is cut by a dicing saw to form a chip of 1.6×3.3 mm. After a process shown in FIG. 3J, a chip coil 10 (FIG. 1) is manufactured.

As a result of a measurement, a chip coil having characteristics of inductance: 21 nH, resonant frequency: 3 GHz, and Q: 95 (at 1000 MHz).

EXPERIMENTAL EXAMPLE III

Surfaces of a glass board (thickness=0.6 mm) of $Na_2O$: $B_2O_3$: $SiO_2$ family are mirror finished, and a conductive film composed of a Ti film of 100 angstroms, a Ti-Ag film of 1000 angstroms and an Ag film of 5 μm is formed on both entire main surfaces of the board by means of sputtering. Next, by means of an etching method, a coil conductor of 6.5 turns having a meander line pattern, a line width of which is 40 μm and a line spacing interval of which is 80 μm, and first and second terminal electrodes are formed. Next, a photosensitive polyimide is coated on an upper surface of the board to form a protective insulation film having a thickness of 5 μm, and therefore, by etching the protective insulation film, the first and second terminal electrodes are exposed. After a process shown in FIG. 3J, a chip coil 10' (FIG. 4) is manufactured.

As a result of a measurement, a chip coil having characteristics of inductance: 8.2 nH, resonant frequency: 5 GHz, and Q: 50 (at 1.5 GHz) was obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a chip coil, comprising the steps of:

(a) preparing a substrate having an insulating surface;

(b) forming a conductive film on the whole insulating surface of said substrate by a thin-film technique;

(c) removing an unnecessary portion of said conductive film by etching to form a coil conductor and a pair of terminal electrodes;

(d) forming an insulation film of a polyimide or polyamide resin on said substrate so as to cover said coil conductor and said pair of terminal electrodes; and (e) removing an unnecessary portion of said insulation film by photolithographic etching to expose at least said pair of terminal electrodes.

2. A manufacturing method in accordance with claim 1, wherein said step (c) includes a step of forming a spiral coil conductor, the outermost end of which is connected to one terminal electrode and the innermost end of which is open.

3. A manufacturing method in accordance with claim 2, further comprising the steps of: (f) etching said insulation film by photolithography to form a throughhole at a portion corresponding in position to said innermost end of said spiral coil conductor; and (g) forming a connecting conductor which connects said innermost end of said spiral coil conductor to the other terminal electrode through said throughhole on said insulation film.

4. A manufacturing method in accordance with claim 3, wherein said step (g) includes the steps of (g-1) forming a further conductive film on the whole surface of said insulation film and (g-2) etching said further conductive film to form said connecting conductor.

5. A manufacturing method in accordance with claim 4, further comprising steps of: (h) forming a further insulation film on said substrate so as to cover said terminal electrodes, said insulation film and said connecting conductor; and (i) removing an unnecessary portion of said further insulation film to expose said first and second terminal electrodes.

6. A manufacturing method in accordance with claim 1, wherein said insulation film is formed in step (d) of a polyimide or polyamide resin having photosensitivity.

7. A manufacturing method in accordance with claim 1, wherein said insulation film is formed in step (d) of a polyimide or polyamide film having substantially no photosensitivity, and said step of removing an unnecessary portion of said insulation film in step (e) includes coating a portion of said insulation film that is not to be removed with a photo-resist film.

8. A manufacturing method in accordance with claim 3, wherein said insulation film is formed in step (d) of a polyimide or polyamide resin having photosensitivity.

9. A manufacturing method in accordance with claim 3, wherein said insulation film is formed in step (d) of a polyimide or polyamide film having substantially no photosensitivity, and said step of removing an unnecessary portion of said insulation film in step (e) includes coating a portion of said insulation film that is not to be removed with a photo-resist film.

10. A manufacturing method in accordance with claim 9, wherein step (f) includes coating a portion of said insulation film that is not to be removed with a photo-resist film.

* * * * *